United States Patent Office 3,170,551
Patented Feb. 23, 1965

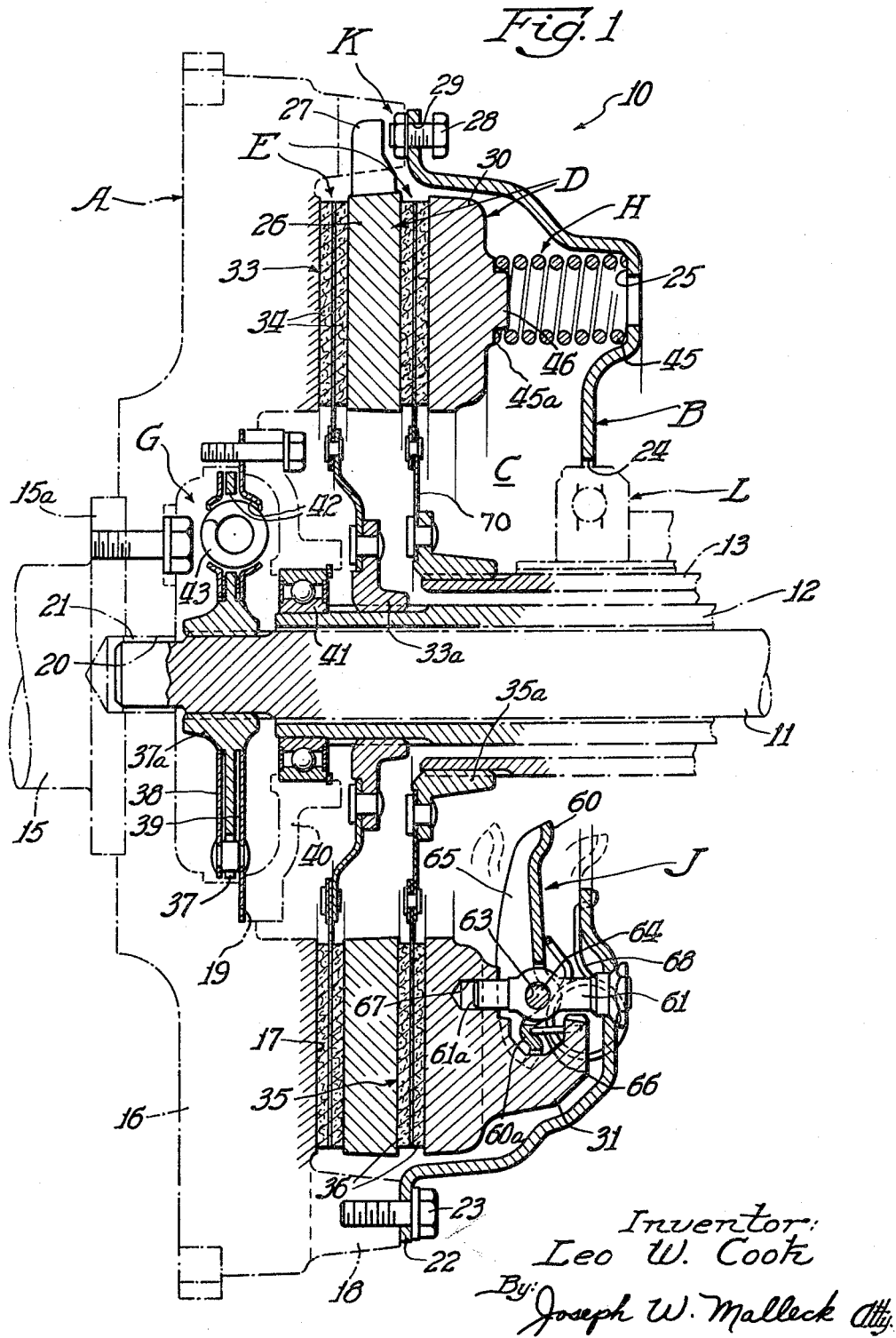

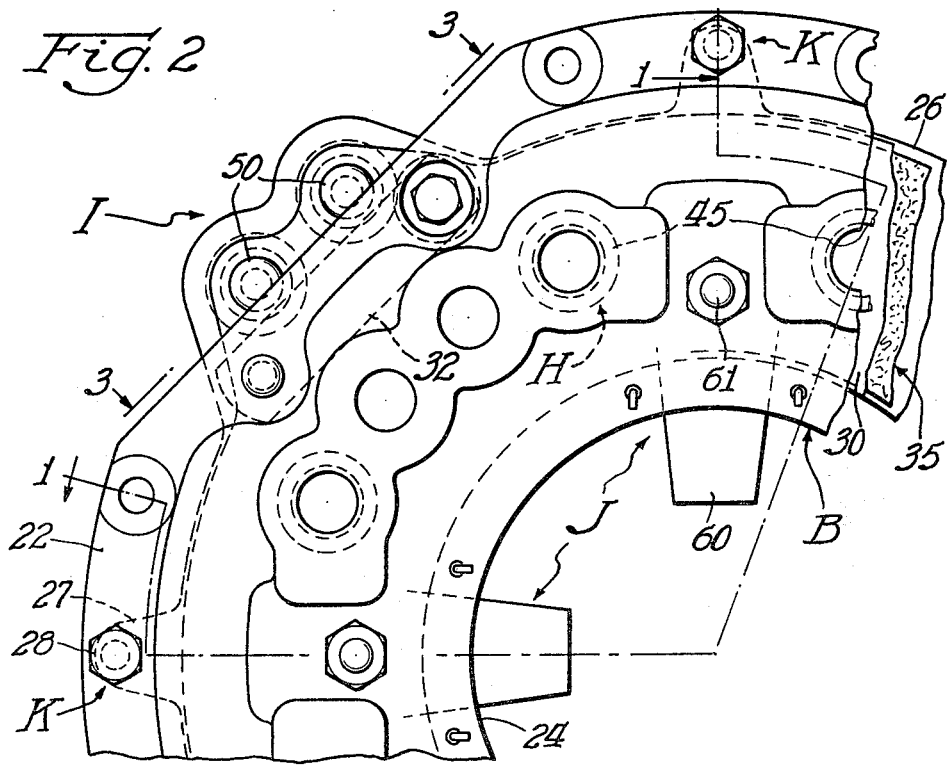
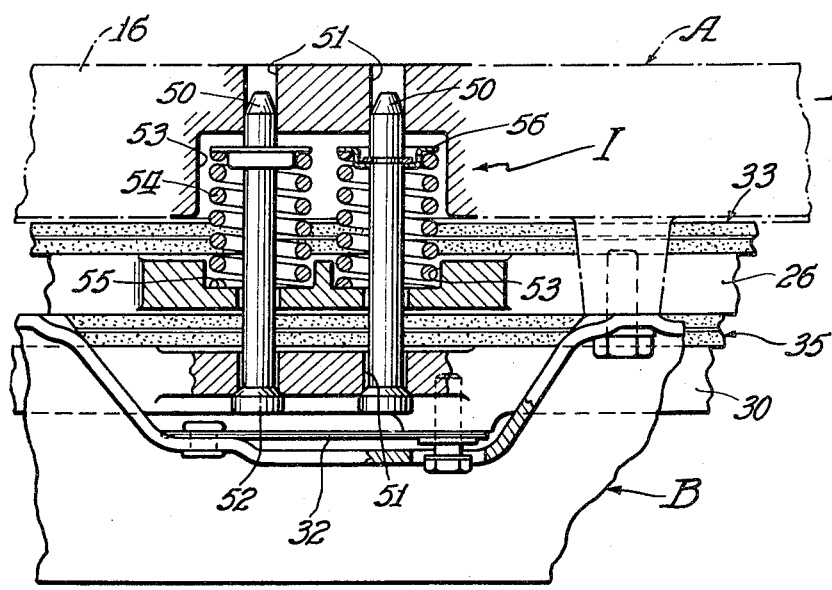

3,170,551
DUAL PLATE CLUTCH
Leo W. Cook, Chicago, Ill., assignor to Borg-Warner Corporation, Chicago, Ill., a corporation of Illinois
Filed Dec. 6, 1962, Ser. No. 242,705
2 Claims. (Cl. 192—48)

This invention relates to clutch devices and more particularly to clutch devices having a plurality of power outputs or takeoffs.

A primary object of this invention is to provide an improved dual takeoff type of clutch device.

Another object of this invention is to provide a clutch device having a plurality of driven means and one which employs a unique clutch engaging means adapted for selecting the driven means to which power will be transmitted and which engaging means is more economical and compact than prior art constructions for this type of clutch. A specific feature in accordance with this object is the obviation of the need for a separate pressure backup plate normally adapted to cooperate in providing clutch engagement for at least one of the driven means.

Still another object of this invention is to provide a dual type clutch device having a first driven shaft which is drivingly connected with the flywheel by means of a torsional vibration adapting means and which device also carries sleeve and quill shafts respectively connected with one of the driven means for providing a plurality of power takeoffs in addition to the primary driven shaft.

Yet another object of this invention is to provide a dual type clutch device which employs a first resilient means adapted to pinch together a pair of axially movable pressure plates with a driven disc therebetween to form a secondary pressure plate assembly, said pressure plate assembly being acted upon by independent second resilient means urging the assembly against a second driven disc and the flywheel for providing clutch engagement of the second driven disc; said first resilient means cooperating to provide more smooth and uniform clutch engagement for each of the driven means than has heretofore been possible.

Other objects and features of the invention will be readily apparent to those skilled in the art from the specification and appended drawings illustrating certain preferred embodiments in which:

FIGURE 1 is a central sectional view of a clutch device incorporating the principles of this invention; the view illustrates certain portions thereof in schematic outline and indicates in broken outline other operative positions of the release levers;

FIGURE 2 is a fragmentary elevational view of the clutch device of FIGURE 1 and viewed from the right; and FIGURE 3 is an enlarged sectional view taken substantially along line 3—3 of FIGURE 2.

Referring now to the drawing and more particularly to FIGURE 1, there is illustrated preferred embodiment of a dual output type friction clutch device employing primary release levers familiarly known as of the eyebolt construction. In its broad aspects, the clutch device, herein designated 10, comprises a drive means A, a cover plate B attached to the drive means to define a chamber C therebetween. First and second pressure plates, together designated D, are adapted to cooperate with the flywheel A for separately clamping a driven means E having more than one driven component. The driven means E is comprised of a plurality of shafts: a primary driven shaft 11, an intermediate sleeve shaft 12 disposed concentrically about the primary shaft and a quill shaft 13 disposed concentrically about the sleeve shaft; certain of the shafts are connected to portions of the driven means E and another of the shafts is connected to the flywheel by way of a torsional vibration dampening means G. A first resilient clutch engaging means I is adapted to pinch together the two pressure plates D and a second resilient clutch engaging means H (see FIGURE 3) is adapted to urge the pressure plates D as a unit toward the drive means. The above-mentioned eyebolt release lever construction is designated J and is adapted to be the primary means of disengaging the pressure plates; a stop means K is adapted to cooperate with the primary releasing means for sequentially disengaging the one pressure plate from the other pressure plate.

More particularly, the drive means A comprises a drive shaft 15 suitably connected to a prime mover such as an internal combustion engine and carries a flywheel 16 fastened to a flange 15a thereof. The flywheel is of the cup-shaped type having an annular flat friction engaging surface 17 adjacent its outer periphery and has a plurality of circumferentially spaced bosses 18 extending axially to one side thereof and beyond the flat surface 17; the bosses 18 are spaced radially outwardly of the flat surface 17. The flywheel has an intermediate offset shoulder 19 that, for purposes hereinafter described, has a central bore 20 extending therethrough and into the shaft 15 adapted to journal a bearing 21.

The cover plate B may be of annular configuration having circumferentially spaced stations 22 fastened by suitable fasteners 23 to the bosses 18 of the flywheel. The cover plate has a central opening 24 adapted to accommodate operating mechanism L of the clutch device and has plurality of circumferentially spaced recesses 25 adapted to journal actuating means of the clutch device.

The pressure plate unit D comprises a first annular pressure plate 26 having a plurality of circumferentially spaced and radially outwardly extending fingers 27 interleaved between the bosses 18. One side of each finger 27 is adapted to contact the stop means K which comprises a cap screw 28 threadably received in threaded opening 29 in the outer periphery of the cover plate and extending inwardly a predetermined distance for preventing axial movement of the pressure plate beyond a limited distance. A second pressure plate 30 is located in general axial alignment with pressure plate 26 and is disposed on a side thereof opposite the flywheel (thereby being the most remote from the flywheel). The pressure plate 30 has a plurality of circumferentially spaced protrusions 31 formed thereon and adapted to journal one end of the release means J. As shown in FIGURE 3, the pressure plate 30 is drivingly connected to the cover plate D by flexible links 32 being disposed in a chordal direction of a circle inscribing the clutch device.

The driven means E comprises a first driven disc 33 having a central hub 33a splined to the intermediate shaft 12 and carrying friction material 34 arranged in an annular configuration and disposed between the pressure plate 26 and the surface 17 of the flywheel 16. The driven means E also comprises a second driven disc 35 having a central hub 35a splined to the quill shaft 13 and mounting a radially extending axially flexible plate 70; a plurality of yieldable metal cushions are secured to the outer margin of plate 70 and carry annularly arranged friction material 36 disposed between the pressure plate 30 and the pressure plate 26 and in general axial alignment therewith.

A driving connection is provided between the primary shaft 11 and the flywheel A by way of the torsional vibration adapting means G. Means G comprises a central disc 37 having a hub portion 37a splined to the shaft 11. Disposed to either side of the disc 37 are side plates 38 and 39 respectively. Plate 39 is drivingly connected with the flywheel and is attached to shoulder 19 formed thereon. A suitable supporting flange 40 is also connected to the shoulder 19 being slightly cup-shaped and having an inner periphery supported by a bearing 41 disposed about inner end of the intermediate shaft 12. A plurality of circumferentially spaced arcuate openings 42 are formed in each of the plates 38 and 39 and the central disc 37; the openings 42 are provided in register with each other and thereby form a receptacle for a plurality of torsional vibration dampening springs 43 disposed therein and adapted to regulate the relative movement between the plates 38, 39 and the central disc 37 in accordance with conventional dampening operation.

The primary means of clutch engagement or actuation is provided by means H consisting of a plurality of circumferentially arranged coil compression springs 45 each having one end journaled and bearing against the recessed area 25 of the cover plate and an opposite end 45a journaled about protrusions 46 formed on the pressure plate 30. The primary engaging means H tends to urge the two pressure plates D and the second driven disc 35 as an assembly against the driven disc 33 for providing selective clutch engagement of the disc 33. In order to provide selective engagement of the second driven disc 35, a novel second clutch actuating means or engaging means I is employed comprising a plurality of guide pins 50 received in aligned openings 51 provided through the first and second pressure plates and the flywheel. Each of the pins has an enlarged head 52 adapted so that the pins will move with the pressure plate 30 when moved downwardly as shown in FIGURE 3 or to the right as viewed in FIGURE 1. Concentrically disposed about the pins 50 are recessed areas 53 provided in the flywheel and in the pressure plate 26 adapted to face each other. Coil compression springs 54 are inserted within the aligned recesses 53 and have one end bearing against the bases 55 of recesses 53 and an opposite end bearing against an annular bracket 56 mounted upon each of the pins and disposed within the recesses 53. Such construction enables the resilient springs 54 to urge the pressure plate 26 toward the pressure plate 30 and thereby pinch the driven disc 35 therebetween. This assembly organizes the pressure plates and driven disc 35 as a unit which may be normally urged by the primary actuating means H toward the flywheel to act as an effective pressure means for the driven disc 33.

Turning now more specifically to the disengaging means for each of the driven discs, the primary means J is comprised of a standard release mechanism, and for purposes of illustration only, the release mechanism illustrated in the figures may be identical with the one disclosed in U.S. Patent No. 2,062,101 to Harold Nutt et al., dated November 24, 1936, which comprises clutch levers 60, pivotally mounted on eyebolt 61 in turn supported in cover B, the clutch levers being actuated by a standard release mechanism (not shown). Each eyebolt 61 has a central opening 63 forming a bearing for a transverse pin 64, which forms a pivot for the lever 60 and is retained in place in the aforementioned opening 63 by flanges 65 on the lever 60. The inner end portion 61a of each eyebolt 61 is received within an opening 67 in the pressure plate 30. The outer end of each lever 60 is return bent at 60a to receive one end of a strut 66; the strut has an opposite end received in suitable grooves in the pressure plate bosses 31 so that when the levers 60 are rotated counterclockwise from the view of FIGURE 1, the pressure plate 30 will be moved against the force of the springs 45 to release the clutch disc 33 from engagement between the flywheel 16 and the pressure unit or assembly composed of both pressure plates and the driven disc 35 held together by the springs 54. Retention springs 68 are provided to engage the cover B and each clutch lever 60 for properly positioning the clutch levers and preventing rattling.

To release pressure plates 26 and 30 from engagement with driven disc 35, the stop means K is provided as heretofore described. Therefore, as the pressure plate 30 is moved to the right in response to actuation of the release means J, the springs 54 will tend to move the second pressure plate therewith until such time as the stop means K limit further movement.

In the preferred embodiment, the employment of three output shafts enable a direct drive to be had to the wheels of a vehicle as well as provision for two takeoff shafts for auxiliary purposes.

In operation, both of the clutch discs 33 and 35 may be engaged by merely relaxing the release means J thereby enabling the primary engaging springs 45 to exert their forces against the pressure plate 30 and by cooperation of the springs 54 move the assembly consisting of the pressure plates and disc 35 against disc 33; the operation of the springs 54 tend to clamp the two pressure plates together to engage disc 35.

The disengagement of each of the driven discs is just the opposite of engagement and is accomplished sequentially. First, the release means J is actuated to initially move the pressure plate 30 to the right a limited distance bringing with it the pressure plate 26 and driven disc 35 and thereby releasing the driven disc 33. After a predetermined axial distance is traversed by the pressure plate 30, stop means K engages the radially extending fingers 27 of the pressure plate 26 to prevent further movement to the right and thereby releases disc 35 from the grasp of both pressure plates.

Particular advantages may be seen to lie in the elimination of separate backup plates or members to cooperate with the various pressure plates and flywheel to enable selective engagement of the different clutch discs. The entire construction is quite elementary and simple and economical. The specific embodiment provides for a direct power drive as well as the provision for two supplementary takeoff means.

While certain preferred embodiments of the invention have been specifically disclosed, it is understood that the invention is not limited thereto, as many variations will be readily apparent to those skilled in the art; and the invention is to be given its broadest possible interpretation within the terms of the following claims.

I claim:

1. A clutch device having a plurality of power outputs, the combination comprising: a rotatable driving flywheel of the type having an exposed internal cavity defined generally by an interior sidewall and an annular peripheral wall terminating in an open mouth and having an annular flange extending radially inwardly from the peripheral wall; a plurality of concentrically arranged driven shafts extending outwardly of said device and comprising a first shaft having one end centrally rotatably journalled in said flywheel and passing through said cavity, a second shaft formed as a sleeve fitting about said first shaft, and a third shaft formed as a sleeve fitting about said second shaft; torsional vibration dampening means disposed between said flywheel flange and cavity sidewall and continuously drivingly connecting the peripheral wall with said first shaft; roller bearing means rotatably journalling one end of said second shaft within said flywheel flange; first and second driven means each comprising a friction disc; first and second annular pressure plates each drivingly connected with said flywheel and each adapted for axial movement relative to each other and to said flywheel; means normally urging the pressure plate most remote from the flywheel in a direction toward the flywheel to provide clutch engagement of at least one of said driven discs; resilient means normally urging said two pressure plates together to provide for clutch engagement of the other of said friction discs; release means adapted to be selectively actuated for overcoming the effects of said first resilient means whereby one of said friction discs may be fully disengaged; stop means adapted to permit limited axial movement of said most remote pressure plate by said first release means so that said other pressure plate will be caused to part from said other friction disc and overcome the effect of said second resilient means.

2. A clutch device having a plurality of power outputs, the combination comprising: a rotatable driving flywheel of the type having an internal exposed cavity defined by an internal sidewall and an annular peripheral wall terminating in a mouth, said flywheel having a plurality of circumferentially spaced bosses extending to one side thereof and formed in the outer peripheral margin of the flywheel, said flywheel further having an annular flange extending radially inwardly from said cavity peripheral wall while in spaced relationship to said cavity sidewall; a cover plate having the outer periphery thereof connected to said bosses whereby said cover plate and flywheel together define a clutch chamber; a first annular pressure plate in said clutch chamber and having a plurality of radially extending fingers between said bosses of said flywheel and effective to engage portions of said cover plate upon axial movement in a direction away from said flywheel; a second pressure plate in said clutch chamber in general alignment with said first pressure plate and disposed most remote from said flywheel; a plurality of driven shafts concentrically arranged and each extending outwardly of said device and comprising a first central shaft having one end centrally rotatably journalled in said flywheel, a second shaft formed as a sleeve fitting about said first shaft and a third shaft formed also as a sleeve fitting about said second shaft; a first friction disc disposed between said first pressure plate and said flywheel and drivingly connected with said second shaft; a second friction disc disposed between said second pressure plate and said first pressure plate and drivingly connected with said third shaft, each disc being effective to be engaged for providing selective drive to one or both of said second and third shaft simultaneously with the driving of said first shaft; torsional vibration dampening means disposed between said flywheel flange and said sidewall and drivingly connecting said peripheral wall with said first shaft to provide a continuous driving connection therebetween; said flywheel and pressure plates each having at least one opening therethrough in general axial alignment; at least one guide pin received in said opening and connected with said second pressure plate for movement therewith; resilient means acting between an opposite end of said guide pin in said first pressure plate; said flywheel and said first pressure plate each having recessed portions adapted to receive respective ends of said spring; first engaging means comprising resilient compression springs adapted to normally urge said second pressure plate toward said flywheel for clamping said first driven disc and first pressure plate therebetween and provide clutch engagement of each of said driven discs; release means adapted to overcome the effect of said first engaging means and move said second pressure plate away from said flywheel whereby said first friction disc will be disengaged, said finger on said first pressure plate adapted to engage said cover plate for limiting axial movement of said first pressure plate along with said second pressure plate and thereby compressing said spring and disengaging said second friction disc therebetween.

References Cited in the file of this patent
UNITED STATES PATENTS

| | | |
|---|---|---|
| 1,888,779 | Tower | Nov. 22, 1932 |
| 2,184,941 | Maroto | Dec. 26, 1939 |
| 2,646,148 | Matrot | July 21, 1953 |

FOREIGN PATENTS

| | | |
|---|---|---|
| 457,023 | Great Britain | Nov. 19, 1936 |
| 1,036,741 | France | Apr. 29, 1953 |